Dec. 14, 1943.　　C. L. HOCKNEY　　2,336,787
INTERNAL COMBUSTION ENGINE
Filed May 7, 1943　　3 Sheets-Sheet 1

Inventor
Chester L. Hockney,

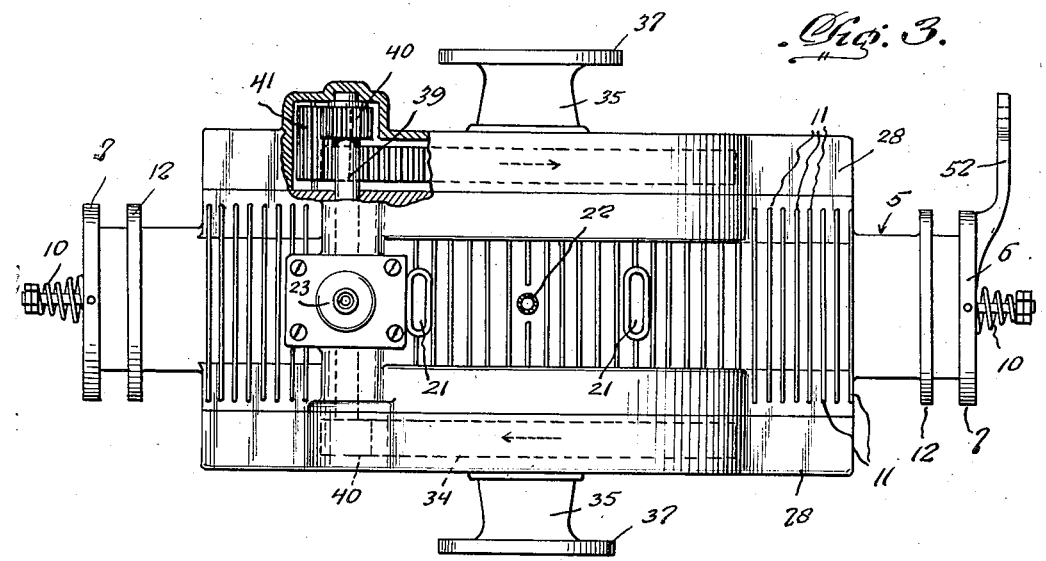

Dec. 14, 1943.    C. L. HOCKNEY    2,336,787
INTERNAL COMBUSTION ENGINE
Filed May 7, 1943    3 Sheets-Sheet 3

Inventor
Chester L. Hockney,

Attorneys

Patented Dec. 14, 1943

2,336,787

UNITED STATES PATENT OFFICE 2,336,787

INTERNAL COMBUSTION ENGINE

Chester L. Hockney, Silverlake, Wis.

Application May 7, 1943, Serial No. 486,027

5 Claims. (Cl. 123—51)

This invention relates to an internal combustion engine operating on the Diesel principle, and has for the primary object the provision of an engine of the above stated character which consists of a minimum number of parts and is extremely compact, durable and light in weight, adapting itself especially for airplane use, permitting the employment of double propellers rotating in opposite directions to each other, which besides providing a maximum amount of propelling force, tends to create a substantially perfect torque balance.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating an airplane equipped with engines constructed in accordance with my invention.

Figure 3 is a top plan view, partly in section, illustrating the engine.

Figure 4 is a longitudinal sectional view illustrating the construction of the cylinders, the pistons therein and the timing of said pistons.

Figure 7 is a fragmentary sectional view illustrating the gearing between a synchronizing shaft and one of the timing gears.

Figure 1:
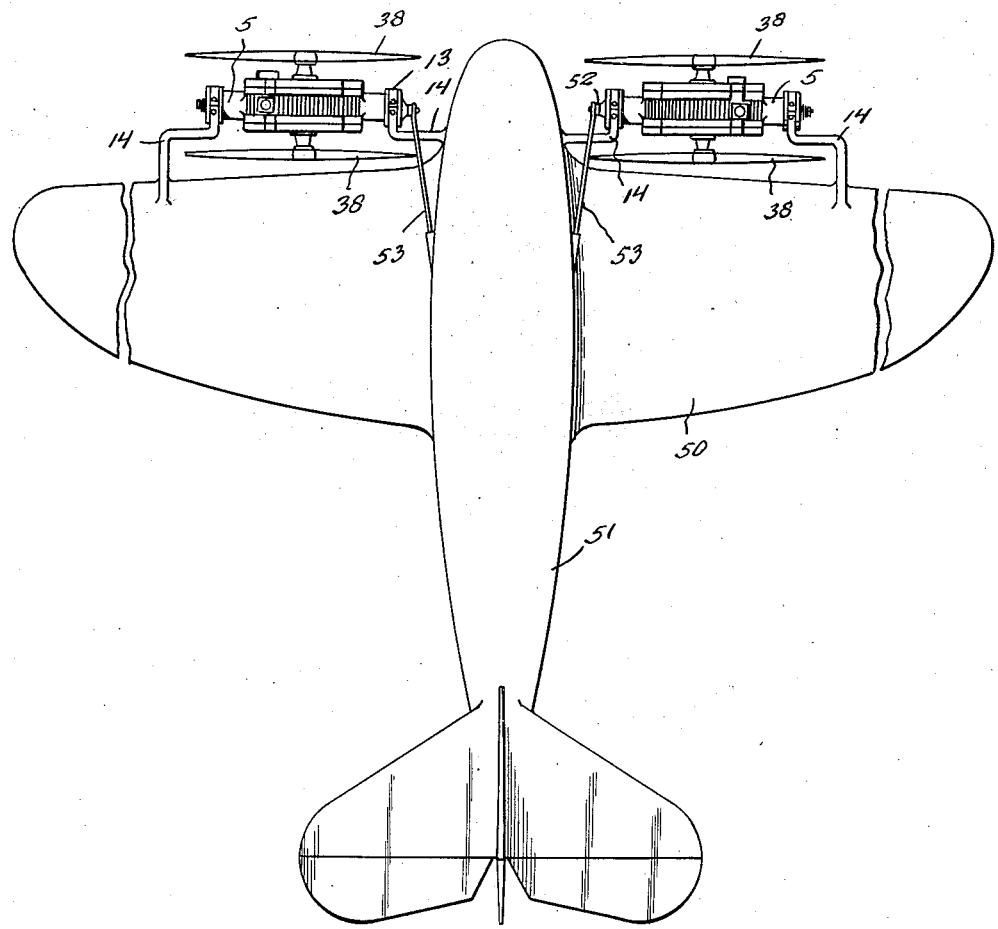

Referring in detail to the drawings, the numeral 5 indicates a cylinder, the overall length thereof being considerably more than the length of a cylinder of a conventional type of engine. The ends of the cylinder are fully open and internally threaded to have threaded therein cylinder heads 6 of the flanged type, as shown at 7, which protrude beyond the walls of the cylinder. The heads 6 are provided with air intake ports 8 controlled by self-seating valves 9. Comparatively light tension coil springs 10 act on the valves for seating the latter and which will permit the valves to open under suction created within the cylinder.

The exterior of the cylinder 5 is equipped with cooling fins 11 and also flanges 12 arranged adjacent the flanges 7 to receive journals 13 for rotatably connecting the cylinder to supporting arms 14'. Other types of mountings not shown may be applied to the cylinder for the support thereof when the engine is to be used for purposes other than that on airplanes so that the cylinder will be held in a fixed position.

Slidably mounted in the cylinder 5 are opposed pistons 14 equipped with suitable packing rings 15 to contact the walls of the cylinder and each has solid end walls 17. The pistons are adapted to slide toward and from each other in the cylinder and the space between the opposing end walls of the pistons forms a firing chamber 18 while the spaces between the ends of the pistons and the heads 6 of the cylinder form compression chambers 19 fed with air by way of the air intake ports 8 during the movement of the pistons in the direction of each other. The air compression chambers 19 are connected to the firing chamber 18 by passages 20 formed in the walls of the cylinder and which passages are closed to the firing chamber at all times except when said pistons reach full compression strokes. The firing chamber is equipped with exhaust ports 21 and a fuel injection nozzle 22 connected with a fuel ejector or pump 23 suitably mounted on the cylinder 5.

The pistons 14 are equipped with wrist pins 24 which extend through slots 25 provided in opposite walls of the cylinder and enter channels or grooves 26 formed in the gear housings 28.

The gear housings 28 are of sectional formation detachably connected by stud bolts 29 and one section of each gear housing forms an integral part of the cylinder and said section has the channels or grooves 26 formed therein.

Thus it will be seen that each gear housing includes a removable section giving access to the interior of the gear housing.

Blocks 30 are detachably secured to the ends of the wrist pins and are slidably mounted in the grooves or channels 26 of the gear housings and have integral therewith bearing pins 31 on which are journaled sleeves 32 operating in cam tracks 33 formed on timing gears 34. The timing gears include hubs 35 journaled on shafts 36 arranged in opposed relation on the cylinder. The hubs and shafts project outwardly of the gear housings with the hubs provided with attaching flanges 37 to permit propellers 38 to be detachably secured thereto. Anti-friction bearings are arranged between the hubs 35 and the shafts 36 to reduce friction.

A synchronizing shaft 39 is journaled in bearings provided on the cylinder and the ends thereof have gears 40 secured thereto. One of the gears meshes with the teeth of one of the timing gears, while the other gear 40 meshes with an idler gear 41 which is in mesh with the other timing gear so that the timing gears 34 will be caused to rotate in opposite directions to each other during the reciprocation of the pistons. The synchronizing shaft 39 has secured thereon a cam 42 engaged by a cam strap 43 forming a part of the fuel pump 23.

The shape of the cam tracks which form an integral part of the timing gears is such as to cause the pistons to reciprocate twice in opposite directions on each complete revolution of the timing gears. This will provide two power impulses to each revolution of the timing gears. Each cam track may be 8 shaped or any other shape which may be found suitable for the operation of the pistons.

In operation, as the pistons move toward each other in the cylinder 5 air is taken in the air compression chambers 19 so that when the pistons move apart the air will be compressed and as the pistons substantially complete their travel apart the passages 20 are uncovered by the pistons permitting the compressed air to flow into the firing chamber for the purpose of scavenging the latter by way of the exhaust ports 21. However, this is only for a very short interval as the pistons again close the passages 20 after traveling for a very limited distance toward each other, the compressed air then being trapped within the firing chamber and is further compressed by the movement of the pistons in the direction of each other and as the pistons near the limit of their movement in the direction of each other the fuel pump acts to inject fuel into the firing chamber. The fuel contacting the compressed air explodes and the force of the explosion acts upon the opposing ends of the pistons to drive them apart. As soon as the pistons uncover the exhaust ports on nearing the limit of their movement apart, the spent gases may then escape from the firing chamber.

Thus it wil be seen that the engine will be capable of developing a maximum amount of horse power from a minimum amount of fuel and due to its construction will be extremely compact, durable and efficient in operation. Also it will be seen that the engine consists of a minimum number of parts and with its compactness lends itself to economical manufacture and will be readily adaptable for airplane use, the compactness of the engine permitting its easy installation on the wing 50 of an airplane 51 as shown in Figure 1, the supporting arms 14' being suitably secured to the airplane so that the engine will be arranged in advance of the wing. The compactness of the engine when mounted on the airplane as shown and described will offer very little or no resistance to the forward motion of the airplane or detract from the normal function of the wing of the airplane.

Figure 2:
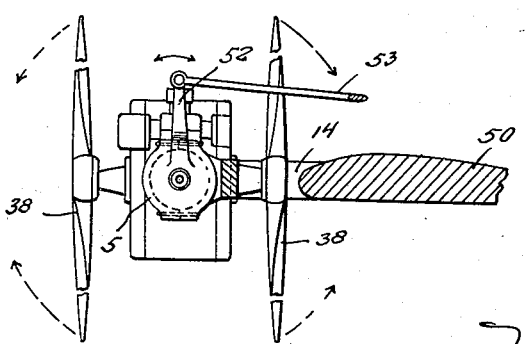
Figure 2 is a fragmentary transverse sectional view illustrating the mounting of one of the engines and how it may be tilted in opposite directions.
Figure 5:
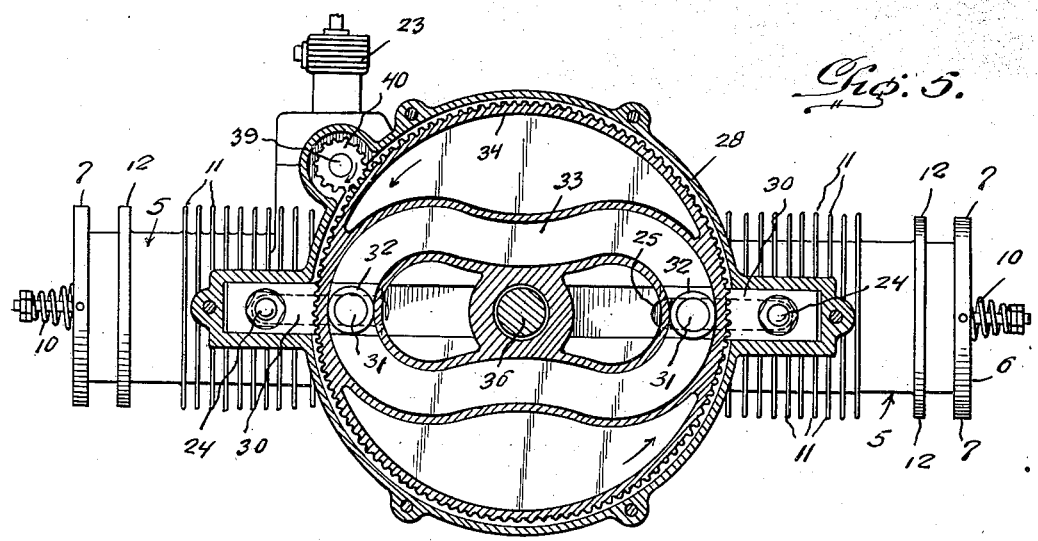
Figure 5 is a sectional view taken on the line 5—5 of Figure 4.
Figure 6:
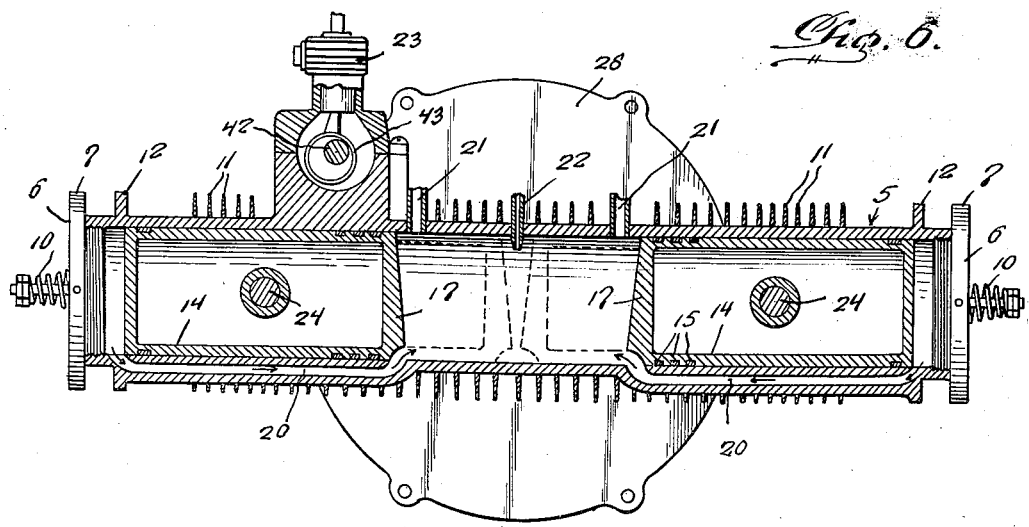
Figure 6 is a vertical sectional view illustrating the bypasses between the firing chamber for the pistons in one cylinder and the air compression chamber.

In the showing made in Figure 1 each wing is equipped with an engine and each engine with a pair of propellers, one propeller of each pair rotating in one direction and the companion propeller thereto rotating in an opposite direction providing a substantially perfect torque balance for the engine. Each engine or one of the heads thereof has integral therewith an arm 52 to which an operating mechanism 53 is connected. This operating mechanism is shown as extending into the body of the airplane and may be of any desired construction whereby the pilot of the airplane may tilt the engine in opposite directions, changing the angle of inclination of the propellers, as shown by the arrows in Figure 2, for either assisting the airplane in making ascents or descents.

While I have described the engine as especially adapted to an airplane, it is to be understood that it may be used for many other purposes and that the cylinder may be so mounted as not to be rotatable relative to the device to which it is adapted.

The construction of engine described and shown will have a perfectly mechanical balance and the force of the explosion is always balanced which is not possible in other types of multiple cylinder engines and further it will be seen that the pistons are not shoved against the side of the cylinder to cause undue wear on the cylinder, consequently resulting in longer life to both the pistons and the cylinder.

While I have shown and described the preferred embodiment of my invention, it will be understood that minor changes in construction, combination and arrangement of parts may be made without departing from the spirit and scope of the invention claimed.

Having thus described my invention, what I claim is:

1. In an internal combustion engine, a cylinder including a head at each end, opposed pistons slidable in said cylinder toward and from each other and forming therein a firing chamber between said pistons and air compression chambers between the pistons and the heads of the cylinder, air intake valves in the heads for admitting air to the air compression chambers by suction created by the pistons on moving in the direction of each other, said cylinder having passages controlled by the movement of the pistons for connecting and disconnecting the air compression chambers with the firing chamber, exhausts for the firing chamber controlled by the sliding movement of the pistons, means for injecting fuel into the firing chamber, timing gear housings mounted on opposite sides of the cylinder and including guides paralleling the cylinder, blocks slidable in said guides, means connecting the blocks to the pistons, and combined timing gears and a power takeoff means journaled in the timing gear housings and connected to the blocks.

2. In an internal combustion engine, a cylinder including a head at each end, opposed pistons slidable in said cylinder toward and from each other and forming therein a firing chamber between said pistons and air compression chambers between the pistons and the heads of the cylinder, air intake valves in the heads for admitting air to the air compression chambers by suction created by the pistons on moving in the direction of each other, said cylinder having passages controlled by the movement of the pistons for connecting and disconnecting the air compression chambers with the firing chamber, exhausts for the firing chamber controlled by the sliding movement of the pistons, means for injecting fuel into the firing chamber, timing gear housings mounted on opposite sides of the cylinder and including guides paralleling the cylinder, blocks slidable in said guides, means connecting the blocks to the pistons, timing gears in the housings, cam tracks formed on the timing gears, means engaging the tracks and carried by the blocks, hubs formed on the timing gears, means for supporting the hubs for rotation, and a synchronizing means connecting the timing gears.

3. In an internal combustion engine, a cylinder including a head at each end, opposed pistons slidable in said cylinder toward and from each other and forming therein a firing chamber between said pistons and air compression chambers between the pistons and the heads of the cylinder, air intake valves in the heads for admitting air to the air compression chambers by suction created by the pistons on moving in the direction of each other, said cylinder having passages controlled by the movement of the pistons for connecting and disconnecting the air compression chambers with the firing chamber, exhausts for the firing chamber controlled by the sliding movement of the pistons, means for injecting fuel into the firing chamber, timing gear housings mounted on opposite sides of the cylinder and including guides paralleling the cylinder, blocks slidable in said guides, means connecting the blocks to the pistons, timing gears in the housings, cam tracks formed on the timing gears, means engaging the tracks and carried by the blocks, hubs formed on the timing gears, means for supporting the hubs for rotation, a shaft journaled on the cylinder, gearing connecting the said shaft to the timing gears whereby the timing gears will be caused to rotate in opposite directions.

4. In an internal combustion engine, a cylinder including a head at each end, opposed pistons slidable in said cylinder toward and from each other and forming therein a firing chamber between said pistons and air compression chambers between the pistons and the heads of the cylinder, air intake valves in the heads for admitting air to the air compression chambers by suction created by the pistons on moving in the direction of each other, said cylinder having passages controlled by the movement of the pistons for connecting and disconnecting the air compression chambers with the firing chamber, exhausts for the firing chamber controlled by the sliding movement of the pistons, means for injecting fuel into the firing chamber, timing gear housings mounted on opposite sides of the cylinder and including guides paralleling the cylinder, blocks slidable in said guides, means connecting the blocks to the pistons, timing gears in the housings, cam tracks formed on the timing gears, means engaging the tracks and carried by the blocks, hubs formed on the timing gears, means for supporting the hubs for rotation, a shaft journaled on the cylinder, gearing connecting said shaft to the timing gears whereby the timing gears will be caused to rotate in opposite directions, and attaching flanges on the hubs to permit propellers to be attached thereto.

5. In an internal combustion engine, a cylinder including a head at each end, opposed pistons slidable in said cylinder toward and from each other and forming therein a firing chamber between said pistons and air compression chambers between the pistons and the heads of the cylinder, air intake valves in the heads for admitting air to the air compression chambers by suction created by the pistons on moving in the direction of each other, said cylinder having passages controlled by the movement of the pistons for connecting and disconnecting the air compression chambers with the firing chamber, exhausts for the firing chamber controlled by the sliding movement of the pistons, means for injecting fuel into the firing chamber, timing gear housings mounted on opposite sides of the cylinder and including guides paralleling the cylinder, blocks slidable in said guides, means connecting the blocks to the pistons, timing gears in the housings, cam tracks formed on the timing gears, means engaging the tracks and carried by the blocks, hubs formed on the timing gears, means for supporting the hubs for rotation, a shaft journaled on the cylinder, gearing connecting said shaft to the timing gears whereby the timing gears will be caused to rotate in opposite directions, attaching flanges on the hubs to permit propellers to be attached thereto, hangers rotatably connected with the cylinder for mounting the latter on an airplane, and means connected to the cylinder for the rotation thereof in opposite directions to change the angle of inclination of the propellers.

CHESTER L. HOCKNEY.